United States Patent [19]
Reale

[11] 4,146,687
[45] Mar. 27, 1979

[54] FLAME RETARDED POLYURETHANE FOAMS WITH IMPROVED COLOR CHARACTERISTICS

[75] Inventor: Michael J. Reale, Brewster, N.Y.

[73] Assignee: Stauffer Chemical Company, Westport, Conn.

[21] Appl. No.: 826,297

[22] Filed: Aug. 22, 1977

[51] Int. Cl.$^2$ .......................... C08K 5/18; C08K 5/46; C08K 5/52

[52] U.S. Cl. ............................. 521/107; 260/45.7 P; 260/45.8 N; 260/45.8 SN; 260/45.9 QB; 521/115; 521/121; 521/128; 521/174; 521/906

[58] Field of Search ............... 260/45.8 SN, 45.9 QB, 260/2.5 AJ, 2.5 BB, ; 521/107

[56] References Cited

U.S. PATENT DOCUMENTS

| | | | |
|---|---|---|---|
| 3,414,618 | 12/1968 | Randell | 252/50 |
| 3,429,837 | 2/1969 | Langrish et al. | 260/45.95 B |
| 3,567,664 | 3/1971 | Haring | 260/2.5 BB |
| 3,574,149 | 4/1971 | Harrington | 260/45.75 W |
| 3,637,542 | 1/1972 | Doerge et al. | 260/2.5 AJ |
| 3,637,573 | 1/1972 | Mise et al. | 260/45.9 QB |
| 3,798,184 | 3/1974 | Cuscurida et al. | 260/45.9 QB |
| 4,005,034 | 1/1977 | Weil | 260/2.5 AJ |
| 4,010,211 | 3/1977 | Preston et al. | 260/2.5 BB |
| 4,021,385 | 5/1977 | Austin et al. | 260/45.9 QB |

OTHER PUBLICATIONS

Materials and Compounding Ingredients for Rubber and Plastics, 1965, pp. 155, 167 and 175

Primary Examiner—Melvyn I. Marquis
Assistant Examiner—R. A. White
Attorney, Agent, or Firm—Daniel S. Ortiz

[57] ABSTRACT

The discoloration of low density polyurethane foams produced with certain flame retardants is reduced by incoporating into the foam phenothiazine and amine antioxidants. The phenothiazine and amine antioxidants can be employed by admixing with the flame retardant from about 0.25 to about 5.0 percent of the phenothiazine-amine antioxidant combination by weight of the flame retardant.

10 Claims, No Drawings

FLAME RETARDED POLYURETHANE FOAMS WITH IMPROVED COLOR CHARACTERISTICS

BACKGROUND OF THE INVENTION

1. Field of the Invention

The present invention generally relates to flame retarded polyurethane foams, and particularly concerns flame retarded, low density polyurethane foams having improved color characteristics.

2. The Prior Art

When low density polyurethane foams are treated with flame retardants to reduce their flammability, certain physical properties of the foams are detrimentally affected. One of the frequent problems is scorching of the center of the foam buns which results in unacceptable color of the foam. This discoloration is reduced to an acceptable level pursuant to the present invention by incorporating phenothiazine and amine antioxidants into the foam.

It is known in the prior art to utilize phenothiazine to prevent propagation of free radical reactions that can cause scorch in polyurethane foams. Such reactions generally involve the ether moieties of the polyether employed in the foam formulation. Various compositions that are normally present in polyurethane foam formulations can catalyze these free radical reactions that cause the scorching. Among such compositions are tertiary amines which can be present in the formulation as catalysts for the reaction of isocyanate with water or with polyol, or as amine-started polyols or both, and various metallic compounds that can be present as impurities. These problems are described in U.S. Pat. No. 3,214,397.

The present invention is distinguished from the prior art in that the foams utilized according to the present invention do not become unacceptably scorched in the absence of the flame retardant. When the flame retardant is added to the foam formulation, however, unacceptable scorch results. It is a theory of the present invention that this scorching is the result of acidity produced by the flame retardant and by oxidation of the amines present in the foam formulation. This is because testing has shown that neither the phenothiazine nor the amine antioxidants alone give the excellent color results that their combination gives. it is a theory of the present invention that the phenothiazine acts as an acid acceptor and the amine antioxidants prevent oxidation of the amines, thereby preventing the unacceptable scorching of the foam by both scorching mechanisms.

SUMMARY OF THE INVENTION

In accordance with the present invention, the color of low density urethane foams treated with flame retardants is improved by the addition of phenothiazine and amine antioxidants to the foam.

Many flame retardants cause color problems in low density urethane foams. The discoloration occurs when the foam becomes scorched during cure. This scorching is believed to be caused by acidity that is produced by the flame retardant and by oxidation of the amines present in the foam formulation. This scorching mechanism is especially likely in the cases where the foam does not scorch on curing in the absence of a flame retardant. By providing a phenothiazine acid acceptor and amine antioxidants in accordance whith the present invention these scorch problems are overcome.

DETAILED DESCRIPTION OF THE INVENTION

The present invention is particularly concerned with low density polyurethane foams that do not become unacceptably scorched when cured in the absence of a flame retardant.

The present invention is also particularly concerned with poly (haloethyl-ethyleneoxy) phosphoric acid esters used as flame retardants in low density polyurethane foams. Such flame retardants are described, for example, in U.S. Pat. No. 3,896,187.

Flame retardant compositions comprised of mixtures of poly (haloethyl-ethyleneoxy) phosphoric acid esters and other flame retardants are also included in the scope of the present invention. Said other flame retardants include tris(haloalkyl) phosphates such as tris (dibromopropyl) phosphate, tris (dichloropropyl) phosphate, tris ($\beta$-chloroethyl) phosphate and tris ($\beta$-chloropropyl) phosphate among others.

The flame retardants are employed in a flame retardant effective amount, generally from about 3 percent to about 20 percent by weight of the polyol in the foam formulation.

The phenothiazine-amine antioxidant combination utilized in accordance with the present invention can be admixed with the foam formulation by conventional techniques. For example, it can be added alone or in combination with other ingredients of the foam formulation. It can also be admixed with the flame retardant composition prior to admixture of the flame retardant with the foam formulation.

The combination of phenothiazine and amine antioxidants employed in the foams of the present invention is generally provided in amounts from about 0.25 percent to about 5.0 percent by weight of the flame retardant composition. The weight ratio of phenothiazine to the amine antioxidants can be from about 1 to 10 to about 10 to 1. Preferred ratios can easily be determined by one skilled in the art on the basis of laboratory testing. Accordingly, a flame retardant composition incorporating the phenothiazine-amine antioxidant combination therein can be conveniently prepared prior to incorporation into the foam formulation.

Amine antioxidants that can be used pursuant to the present invention include N-(octylphenyl)-$\alpha$-naphylthylamine; N,N'-bis(s-methylheptyl)-p-phenylenediamine; N-isopropyl-N'-phenyl-p-phenylenediamine; 4,4'-dioctyldiphenylamine; and diphenylamine-acetone reaction product.

Numerous conventional foam formulations for low density polyurethane foams can be utilized in accordance with the present invention. The selection of ingredients and process conditions can easily be determined by those skilled in the art.

The color of the foams of the present invention can be evaluated by numerous recognized methods as set forth; for example, in Principles of Color Technology, Fred W. Billinger, Jr. and Max Saltzman (Wiley Interscience, 1966).

In the experimental work on the present invention, a Hunter colorimeter was utilized to measure color difference pursuant to the color-difference formula:

$$\Delta E \text{ (Hunter)} = (\Delta L^2 + \Delta a^2 + \Delta b^2)^{1/2}$$

Where:

ΔE (Hunter) = color difference

ΔL = lightness compared to standard

Δa = redness, if positive, or greeness, if negative, compared to a standard

Δb = yellowness, if positive, or blueness, if negative, compared to a standard

All of the values for ΔL, Δa and Δb are calculated within the Hunter instrument by electrical means and read directly from its dials. The most commonly used standard of color comparison is a pure white sample. A white tile was used in the experimental work on the present invention.

The present invention will be more fully illustrated in the Examples which follow.

EXAMPLES

Several foam formulations were prepared. The basic foam formulation components for each one were as follows:

| | |
|---|---|
| 3500 Molecular weight polyether polyol | 100 grams |
| 80/20 Toluene diisocyanate (110 Index) | 61.1 grams |
| Water | 5.0 grams |
| Non-hydrolyzable silicone surfactant | 1.1 gram |
| Diazabicyclo octane catalyst (33% active) | 0.3 gram |
| N-Ethylmorpholine catalyst | 0.05 gram |
| 50% Stannous octoate | 0.4 gram |
| Flame retardant (2:1 blend of poly(chloroethylethyleneoxy) phosphoric acid ester: tris (dichloropropyl phosphate) | 8.0 grams |

One of the foam formulations was admixed with a flame retardant and cured. The remaining foam formulations were admixed with the same flame retardant and various amounts of phenothiazine, amine antioxidants and combinations of phenothiazine and amine antioxidants.

After mixing all of the foam ingredients, the materials for each foam formulation were poured into a 12″ × 12″ × 5″ cake box. When the foam buns completed their rises, thermocouples were inserted into the centers of the buns. When the thermocouples recorded 150° C., they were removed from the buns. The buns were then placed into a preheated microwave oven that had been calibrated so that 350 grams of water would increase in temperature by 50° C. when heated for 4 minutes. The buns were cured in the oven for four minutes, and then removed and allowed to cure at room temperature for an additional 30 minutes.

Following the cure of the buns, a one inch thick slice was cut perpendicular to the rise from the center of each bun. A two inch square sample was then removed from the center of each slice. A Hunter colormeter was then used to measure the values for calculating color difference.

The results are set forth in Table I.

TABLE I

| FOAM NO. | ADDITIVE | WEIGHT RATIO OF ADDITIVES | WEIGHT % ADDITIVE TO FLAME RETARDANT | ΔE |
|---|---|---|---|---|
| 1. | — | — | — | 19.69 |
| 2. | phenothiazine | — | 0.25 | 7.22 |
| 3. | N-octylphenyl-α-naphthylamine | — | 0.25 | 8.35 |
| 4. | phenothiazine: N-octylphenyl-α-naphthylamine | 10:90 | " | 1.49 |
| 5. | " | 25:75 | " | 3.87 |
| 6. | " | 50:50 | " | 3.84 |
| 7. | " | 75:25 | " | 7.55 |
| 8. | " | 90:10 | " | 6.05 |
| 9. | phenothiazine | | 0.50 | 4.91 |
| 10. | N-octylphenyl-α-naphthylamine | | " | 7.06 |
| 11. | phenothiazine: N-octylphenyl-α-naphthylamine | 10:90 | " | 7.22 |
| 12. | " | 50:50 | " | 3.37 |
| 13. | " | 90:10 | " | 3.04 |
| 14. | phenothiazine | | 1.0 | 6.85 |
| 15. | N-octylphenyl-α-naphthylamine | | " | 23.66 |
| 16. | phenothiazine: N-octylphenyl-α-naphthylamine | 10:90 | 1.0 | 3.28 |
| 17. | " | 25:75 | " | 2.16 |
| 18. | " | 50:50 | " | 5.58 |
| 19. | " | 75:25 | " | 6.17 |
| 20. | " | 90:10 | " | 6.92 |
| 21. | phenothiazine | | 5.0 | 6.43 |
| 22. | N-octylphenyl-α-naphthylamine | | " | 7.56 |
| 23. | phenothiazine: N-octylphenyl-α-naphthylamine | 10:90 | " | 4.70 |
| 24. | " | 50:50 | " | 7.85 |
| 25. | " | 90:10 | " | 10.25 |
| 26. | N,N'-bis(s-methylheptyl)-p-phenylenediamine | | 0.50 | 6.48 |
| 27. | N,N'-bis(s-methylheptyl)-p-phenylenediamine: phenothiazine | 50:50 | " | 2.55 |
| 28. | N-isopropyl-N'-phenyl-p-phenylenediamine | | 0.50 | 7.61 |
| 29. | N-isopropyl-N'-phenyl-p-phenylenediamine: phenothiazine | 50:50 | " | 5.91 |
| 30. | 4,4'-dioctyldiphenylamine | | 0.50 | 9.13 |

TABLE I-continued

| FOAM NO. | ADDITIVE | WEIGHT RATIO OF ADDITIVES | WEIGHT % ADDITIVE TO FLAME RETARDANT | ΔE |
|---|---|---|---|---|
| 31. | 4,4'dioctyldiphenylamine: pheniothiazine | 50:50 | " | 8.57 |
| 32. | diphenylamine-acetone reaction product | | 0.50 | 8.37 |
| 33. | diphenylamine-acetone reaction product: phenothiazine | 50:50 | " | 7.73 |

Having set forth the general nature and some examples of the present invention, the scope is now particularly set forth in the appended claims.

What is claimed is:

1. A flame retardant polyurethane foam comprising a low density polyurethane foam derived from a polyether polyol, a flame retardant amount of a flame retardant comprised of a poly(haloethylethyleneoxyl)phosphoric acid ester and from about 0.25 percent to about 5.0 percent by weight of said flame retardant of a mixture of phenothiazine and an amine antioxidant selected from the group consisting of N-(octylphenyl)-α-naphthylamine; N,N'-bis (s-methylheptyl)-p-phenylenediamine; N-isopropyl-N'-phenyl-p-phenylenediamine; 4,4'-dioctyldiphenylamine; and diphenylamine-acetone reaction product wherein said phenothiazine and amine antioxidant are present in a weight ratio from about 10 to 1 to about 1 to 10 and said low density polyurethane foam does not scorch on curing in the absence of a flame retardant.

2. The flame retardant polyurethane foam of claim 1 wherein the flame retardant is further comprised of a tris (haloalkyl) phosphate.

3. The flame retardant polyurethane foam of claim 2 wherein the weight ratio of poly (haloethyl-ethylenoxy) phosphoric acid ester to tris (haloalkyl) phosphate is about 2 to 1.

4. The flame retardant polyurethane foam of claim 2 wherein the amount of flame retardant is from about 3 percent to about 20 percent by weight of polyol present in the foam formulation.

5. The flame retardant polyurethane foam of claim 2 wherein the poly (haloethyl-ethyleneoxy) phosphoric acid ester is poly (chloroethyl-ethyleneoxy) phosphoric acid ester and the tris (haloalkyl) phosphate is tris (dichloropropyl) phosphate.

6. A composition for flame retarding low density polyurethane foams comprising a poly(haloethyl-ethyleneoxy) phosphoric acid ester and from about 0.25 percent to about 5.0 percent by weight of said ester of a mixture of phenothiazine and an amine antioxidant selected from the group consisting of N-(octylphenyl)-α-naphthylamine; N,N'-bis (s-methylheptyl)-p-phenylenediamine; N-isopropyl-N'phenyl-p-phenylenediamine; 4,4'-dioctyldiphenylamine; and diphenylamine-acetone reaction product wherein said phenothiazine and amine antioxidant are present in a weight ratio from about 10 to 1 to about 1 to 10 and said low density polyurethane foams do not scorch on curing in the absence of a flame retardant.

7. The composition of claim 6 further comprising a tris (haloalkyl) phosphate.

8. The composition of claim 7 wherein the weight ratio of poly (haloethyl-ethyleneoxy)phosphoric acid ester to tris (haloalkyl)phosphate is about 2 to 1.

9. The composition of claim 7 wherein the poly (haloethyl-ethyleneoxy) phosphoric acid ester is poly (chloroethyl-ethyleneoxy) phosphoric acid ester and the tris (haloalkyl) phosphate is tris (dichloropropyl) phosphate.

10. A method of preparing a flame retardant low density polyurethane foam derived from a polyether polyol comprising admixing with a foam formulation a flame retardant comprised of a poly (haloethyl-ethyleneoxy) phosphoric acid ester and a tris (haloalkyl) phosphate and further admixing from about 0.25 percent to about 5.0 percent by weight of said flame retardant of a mixture phenothiazine and an amine antioxidant selected from the group consisting of N-(octylphenyl)-α-naphythylamine; N,N'-bis(s-methylheptyl)-p-phenylenediamine; N-isopropyl-N'-phenyl-p-phenylenediamine; 4,4'-dioctyldiphenylamine; and diphenylamine-acetone reaction product wherein said phenothiazine and amine antioxidant are present in a weight ratio from about 10 to 1 to about 1 to 10 and said low density polyurethane foam does not scorch on curing in the absence of a flame retardant; followed by curing.

* * * * *